(12) United States Patent
Huang

(10) Patent No.: US 10,760,727 B2
(45) Date of Patent: Sep. 1, 2020

(54) DISPLAY STAND

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 0 days.

(21) Appl. No.: 16/413,625

(22) Filed: May 16, 2019

(65) Prior Publication Data
US 2019/0353295 A1    Nov. 21, 2019

Related U.S. Application Data

(60) Provisional application No. 62/673,135, filed on May 18, 2015.

(51) Int. Cl.
| *F16M 11/04* | (2006.01) |
| *F16M 11/08* | (2006.01) |
| *F16M 11/24* | (2006.01) |

(52) U.S. Cl.
CPC ........... *F16M 11/04* (2013.01); *F16M 11/045* (2013.01); *F16M 11/046* (2013.01); *F16M 11/08* (2013.01); *F16M 11/24* (2013.01)

(58) Field of Classification Search
CPC ........ F16M 11/16; F16M 11/20; F16M 11/04; F16M 11/045; F16M 11/046; F16M 11/08; F16M 11/2014; F16M 11/2085; F16M 11/24; F16M 2200/027
See application file for complete search history.

(56) References Cited

U.S. PATENT DOCUMENTS

| 1,098,077 | A | * | 5/1914 | Annison | ................... | E02D 5/08 |
| | | | | | | 405/279 |
| 4,438,605 | A | * | 3/1984 | DeLucia | ................... | E04B 1/76 |
| | | | | | | 16/225 |
| 5,502,930 | A | * | 4/1996 | Burkette | ............... | E04B 2/7429 |
| | | | | | | 16/225 |
| D649,552 | S | * | 11/2011 | Huang | .................. | F16M 11/08 |
| | | | | | | D14/452 |
| 8,162,268 | B1 | | 4/2012 | Huang | | |
| D660,308 | S | * | 5/2012 | Huang | ........................ | D14/452 |
| 9,746,128 | B2 | * | 8/2017 | Huang | ............... | F16M 11/2014 |
| 2012/0056050 | A1 | * | 3/2012 | Huang | .................. | F16M 11/045 |
| | | | | | | 248/124.1 |
| 2016/0281915 | A1 | * | 9/2016 | Bowman | .............. | F16M 11/045 |

\* cited by examiner

*Primary Examiner* — Tan Le
(74) *Attorney, Agent, or Firm* — JCIPRNET

(57) ABSTRACT

A display stand for supporting a plurality of displays. The display stand includes an upright rod, a first supporting arm, a second supporting arm and a hinge joint member. The upright rod extends along an axial direction. The first supporting arm is for supporting a first display. The second supporting arm is for supporting a second display. The hinge joint member includes a first knuckle, a second knuckle, a first stopping surface and a second stopping surface. The first knuckle is disposed on the upright rod and the first supporting arm, and has a first cylinder and a first pivoting seat. The second knuckle is disposed on the upright rod and the second supporting arm, and has a second cylinder and a second pivoting seat.

13 Claims, 15 Drawing Sheets

US 10,760,727 B2

DISPLAY STAND

CROSS-REFERENCE TO RELATED APPLICATION

This application claims the priority benefit of U.S. provisional application Ser. No. 62/673,135, filed on May 18, 2018. The entirety of the above-mentioned patent application is hereby incorporated by reference herein and made a part of this specification.

BACKGROUND OF THE INVENTION

1. Field of the Invention

The present invention relates to a display stand, and particularly relates to a display stand for supporting a plurality of displays.

2. Description of Related Art

With the development of software in recent years, operating systems compatible with use of multiple displays at the same time keep emerging and become more and more popular. A stand which normally allows only one display to be mounted is less convenient when used with such operating system. For example, to adjust the included angle between displays, it is very likely that at least one of the displays, together with the stand, needs to be lifted up and then put down in order to render the desired included angle between the displays. Besides, when the user moves his/her seat and intends to adjust the displays to face him/her directly, the user needs to move one of the displays as well as the stand, move the other display as well as the stand, and then make adjustment to set the desired included angle, which causes inconvenience and is laborious.

FIG. 1 is a schematic view of a conventional display stand illustrating the technology of U.S. Pat. No. 8,162,268 B1. Referring to FIG. 1, a display stand 9 shown in FIG. 1 includes a base 91, a standing rod 92 vertically disposed on the base 91, two supporting arms 93 and 94 rotatable along the axis on the standing rod 92 and slidably sleeved on the standing rod 92, and two hinges 95 respectively horizontally slidably sleeved on the two support arms 93 and 94 and provided for mounting displays.

The supporting arm 93 has a pivoting portion 931. A tenon 9311 and a slot 9312 are formed on the bottom side of the pivoting portion 931. The supporting arm 94 has a pivoting portion 941. A slot 9411 for accommodating the tenon 9311 of the pivoting portion 931 and a tenon 9412 for being placed into the slot 9312 of the pivoting portion 931 are formed on the top side of the pivoting portion 941.

With such a structure, after the user moves his/her seats, he/she no longer needs to move each of the displays, but only needs to rotate the supporting arms 93 and 94 on the standing rod 92 to make the displays face him/her. Besides, after the heights of the supporting arms 93 and 94 are adjusted to engage the tenons 9311 and 9412 into the slots 9312 and 9411, the fitting between the tenons 9311 and 9412 and the slots 9312 and 9411 can limit the angle at which the supporting arms 93 and 94 rotate along the standing rod to prevent the display stand 9 from toppling over.

However, when the supporting arms 93 and 94 are at different heights, the tenons 9311 and 9412 are unable to be effectively engaged into the slots 9312 and 9411. At this time, if the user excessively rotates the supporting arms 93 and 94, the display stand 9 may be easily out of balance and topple over.

SUMMARY OF THE INVENTION

The present invention provides a display stand, in which the angles at which the user rotates the supporting arms can be effectively limited to prevent the display stand from being out of balance and toppling over.

A display stand according to an embodiment of the invention is configured to support a plurality of displays. The display stand includes an upright rod, a first supporting arm, a second supporting arm and a hinge joint member. The upright rod extends along an axis. The first supporting arm is configured to support a first display. The second supporting arm is configured to support a second display. The hinge joint member includes a first knuckle, a second knuckle, a first stopping surface, and a second stopping surface. The first knuckle is disposed on the upright rod and the first supporting arm, and has a first cylinder and a first pivoting seat. The first cylinder is pivotally accommodated in the first pivoting seat, such that the first supporting arm is pivotally rotatable with respect to a radial direction of the axis, and stops at any position between a first position and a second position. The second knuckle is disposed on the upright rod and the second supporting arm, and has a second cylinder and a second pivoting seat. The second cylinder is pivotally accommodated in the second pivoting seat, such that the second supporting arm is pivotally rotatable with respect to the radial direction of the axis, and stops at any position between the first position and the second position. When the first supporting arm is at the first position, the first pivoting seat abuts against the first stopping surface. When the first supporting arm is at the second position, the first pivoting seat abuts against the second stopping surface. When the second supporting arm is at the first position, the second pivoting seat abuts against the first stopping surface. When the second supporting arm is at the second position, the second pivoting seat abuts against the second stopping surface.

According to an embodiment of the invention, the first pivoting seat and the second pivoting seat respectively have a hollow tube and an opening slot formed at the hollow tube. The hollow tube and the opening slot of the first pivoting seat extend along the axis. The first cylinder is accommodated in the hollow tube of the first pivoting seat and may be reciprocally slidable along the axis. The hollow tube and the opening slot of the second pivoting seat extend along the axis. The second cylinder is accommodated in the hollow tube of the second pivoting seat and may be reciprocally slidable along the axis.

According to an embodiment of the invention, the hinge joint member further has two hollow bushings. One of the hollow bushings is clamped between the first cylinder and the first pivoting seat, whereas the other hollow bushing is clamped between the second cylinder and the second pivoting seat. Each of the hollow bushings respectively has a perforated groove extending along the axis.

According to an embodiment of the invention, first pivoting seat is disposed on the first supporting arm, and the second pivoting seat is disposed on the second supporting arm. The upright rod has a connecting plate. The connecting plate passes through the opening slots and the perforated grooves and connects the first cylinder and the second cylinder. The first stopping surface and the second stopping surface are respectively formed on the opposite two sides of the connecting plate and are interposed between the first cylinder and the second cylinder.

According to an embodiment of the invention, the first supporting arm has an arm plate. The arm plate of the first supporting arm passes through the opening slot and the perforated groove to be connected to the first cylinder. The second supporting arm has an arm plate. The arm plate of the second supporting arm passes through the opening slot and the perforated groove to be connected to the second cylinder. The first stopping surface and the second stopping surface are respectively formed on the opposite two sides of the arm plate. The first pivoting seat and the second pivoting seat are formed on the upright rod.

According to an embodiment of the invention, the upright rod has a connecting plate. One side of the connecting plate passes through the opening slot and the perforated groove to be connected to the first cylinder. The other side of the connecting plate is connected to the second pivoting seat. The first pivoting seat is disposed on the first supporting arm. The second supporting arm has an arm plate. The arm plate of the second supporting arm passes through the opening slot and the perforated groove to be connected to the second cylinder. The first stopping surface and the second stopping surface are respectively formed on the opposite two sides of the arm plate and the connecting plate.

According to an embodiment of the invention, the hinge joint member further has a plurality of adjustment members. The adjustment members are disposed to the first pivoting seat and the second pivoting seat and configured to adjust an extent of clamping with respect to the first cylinder and the second cylinder.

According to an embodiment of the invention, each of the adjustment members respectively includes a screw and a clamping pad. The clamping pad is correspondingly disposed on the screw. The clamping pad moves along the radial direction of the axis by rotating the corresponding screw.

According to an embodiment of the invention, the first cylinder has an outer convex circular arc surface. The first pivoting seat has an inner concave circular arc surface. The outer convex circular arc surface of the first cylinder and the inner concave circular arc surface of the first pivoting seat match with each other. The second cylinder has an outer convex circular arc surface. The second pivoting seat has an inner concave circular arc surface. The outer convex circular arc surface of the second cylinder and the inner concave circular arc surface of the second pivoting seat match with each other.

According to an embodiment of the invention, a first reference line connected between a first point on the inner concave circular arc surface and a reference point on the axis and a second reference line connected between a second point on the inner concave circular arc surface and the reference point on the axis define a first angle in the radial direction with respect to the axis. A third reference line connected between a third point on the first stopping surface and the reference point on the axis and a fourth reference line connected between a fourth point on the second stopping surface and the reference point on the axis define a second angle in the radial direction with respect to the axis. The first point contacts the third point while the first supporting arm or the second supporting arm is at the first position and the second point contacts the fourth point while the supporting first supporting arm or the second supporting arm is at the second position. The maximum radial pivoting angle range for rotation of the first supporting arm or the second supporting arm along the radial direction between the first position and the second position is a difference between a value of the first angle and a value of the second angle.

According to an embodiment of the invention, the maximum radial pivoting angle of the first supporting arm or the second supporting arm in the radial direction with respect to the axis is between 20° and 40°.

According to an embodiment of the invention, a radius corresponding to the inner concave circular arc surface is greater than a radius corresponding to the outer convex circular arc surface.

According to an embodiment of the invention, the first supporting arm and the second supporting arm optionally move along the axis.

According to an embodiment of the invention, the first supporting arm has a first arm body and a first hinge. The first hinge is slidably disposed on the first arm body and is configured to support the first display. The second supporting arm has a second arm body and a second hinge. The second hinge is slidably disposed on the second supporting arm and is configured to support the second display.

According to an embodiment of the invention, the first arm body has a first perforated groove. The first hinge has a first portion, a first engaging end, a first fixing plate, a first fastener, and a first shaft. The first engaging end is connected to the first portion and is slidably disposed in the first perforated groove. The first fastener and the first engaging end are located on the opposite two sides of the first arm body, and the first fastener is fastened to the first engaging end, such that the first hinge is optionally fixed on the first supporting arm. The first shaft is disposed on the first portion. The first fixing plate is pivotally disposed on the first shaft. The first display is disposed on the first fixing plate. The second arm body has a second perforated groove. The second hinge has a second portion, a second engaging end, a second fixing plate, a second fastener and a second shaft. The second engaging end is connected to the second portion and is slidably disposed in the second perforated groove. The second fastener and the second engaging end are located on the opposite two sides of the second arm body, such that the second hinge is optionally fixed on the second supporting arm. The second shaft is disposed on the second portion. The second fixing plate is pivotally disposed on the second shaft. The second display is disposed on the second fixing plate.

Based on the above, in the display stand according to the embodiments of the invention, the hinge joint member enables the first supporting arm and the second supporting arm to pivot in a radial direction with respect to the axis, and respectively stops at any position between a first position and a second position. When the first supporting arm or the second supporting arm is at the first position, the first pivoting seat or the second pivoting seat abuts against the first stopping surface. When the first supporting arm or the second supporting arm is at the second position, the first pivoting seat or the second pivoting seat abuts against the second stopping surface. Accordingly, the angles at which the user rotates the supporting arms can be effectively limited to prevent the display stand from being out of balance and toppling over.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
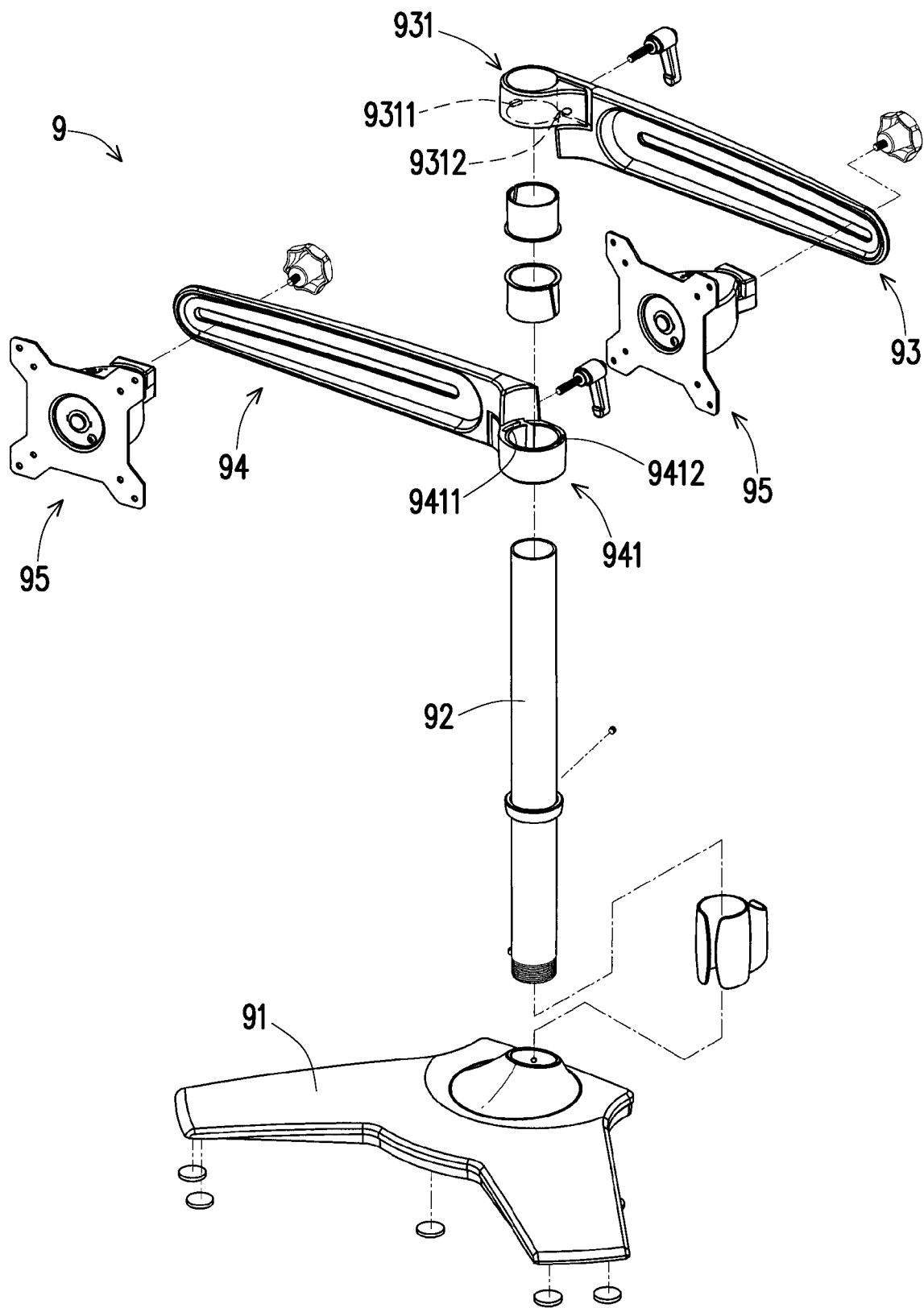
FIG. 1 is a schematic view of a conventional display stand.

Reference will now be made in detail to the present preferred embodiments of the invention, examples of which are illustrated in the accompanying drawings. Wherever possible, the same reference numbers are used in the drawings and the description to refer to the same or like parts.

Figure 2:
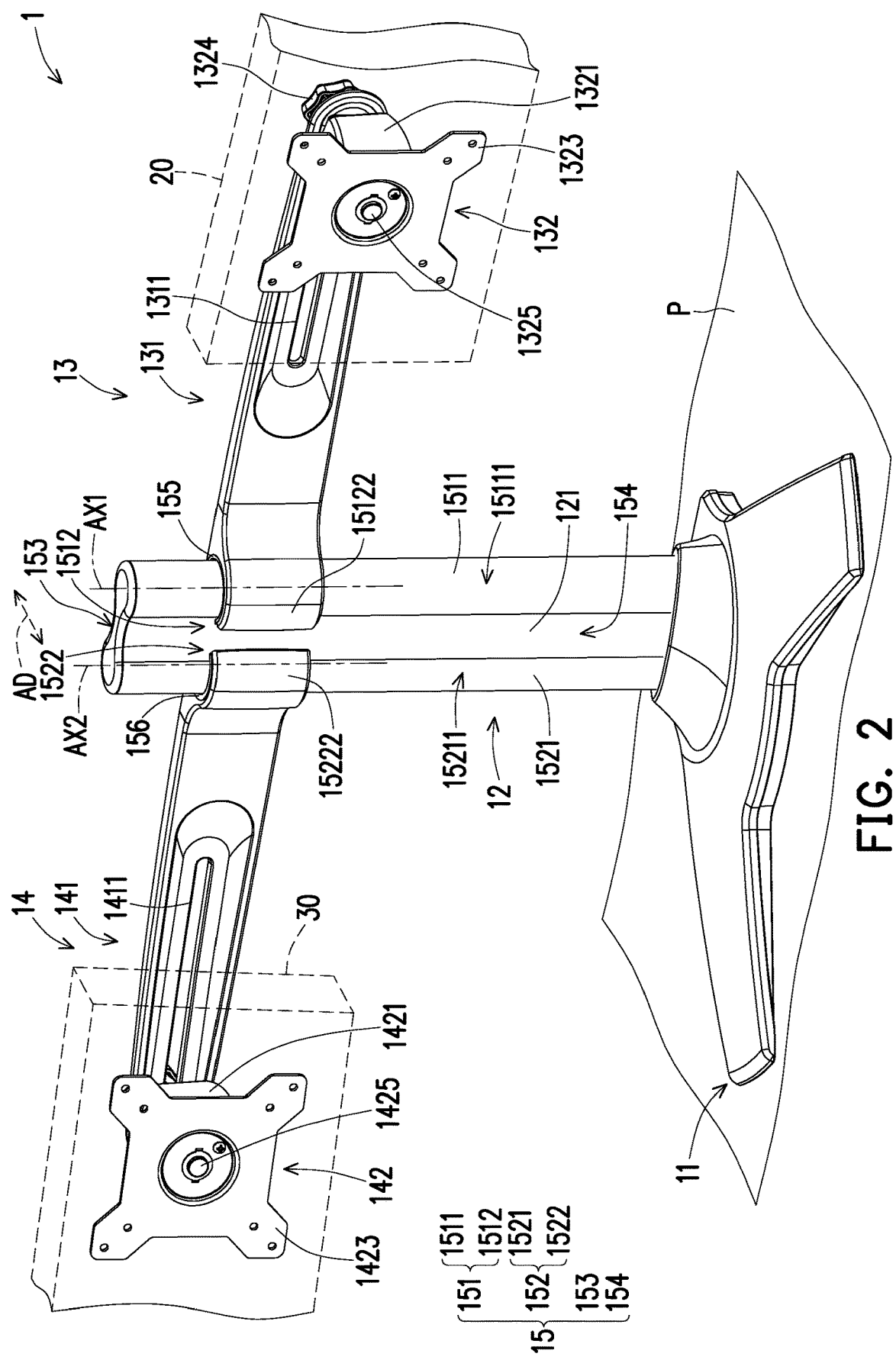
FIG. 2 is a schematic perspective view of a display stand to which a first display and a second display are assembled according to an embodiment of the invention.
Figure 3:
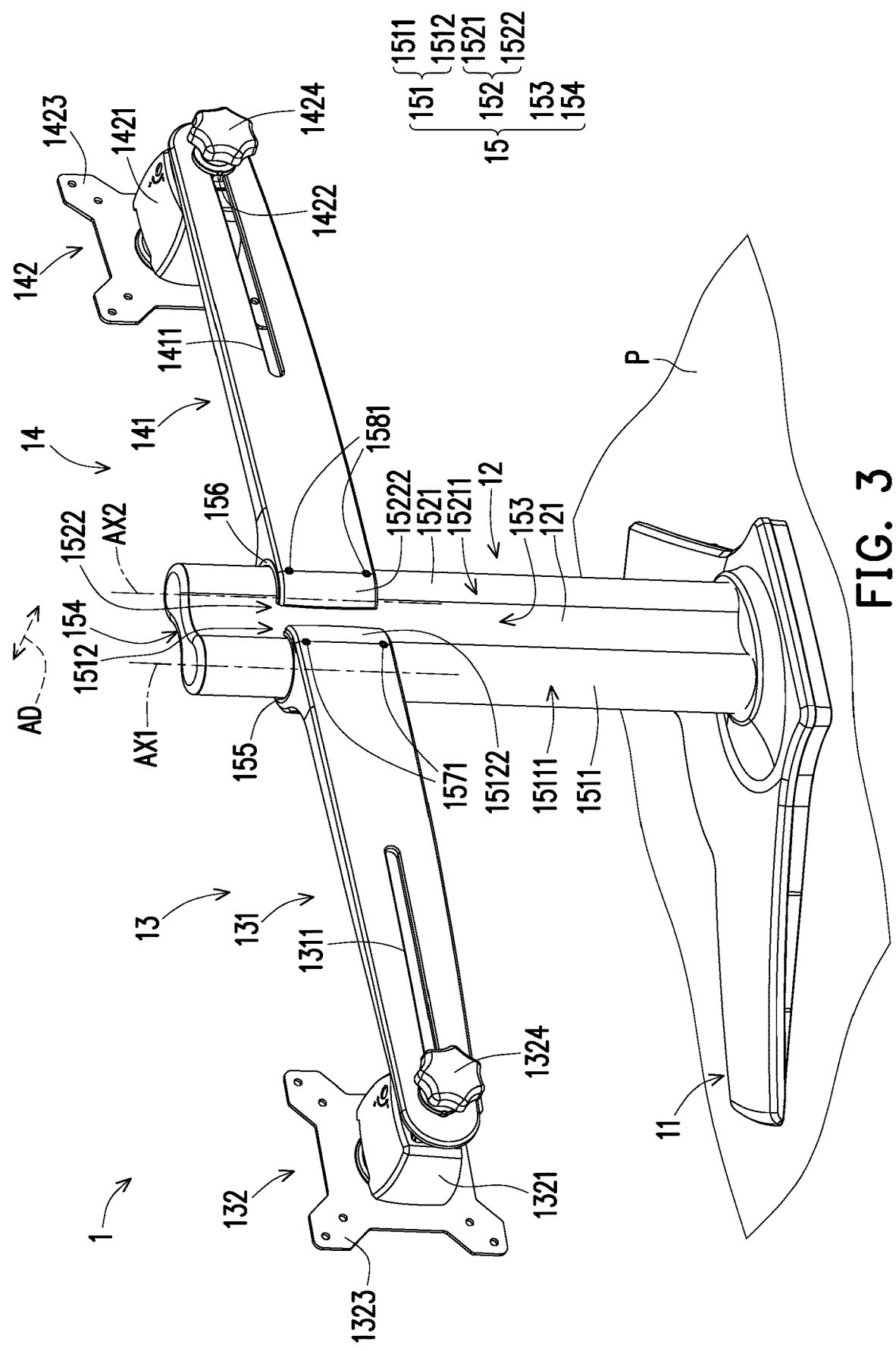
FIG. 3 is a schematic perspective view of the display stand of FIG. 2 from another perspective.
Figure 4:
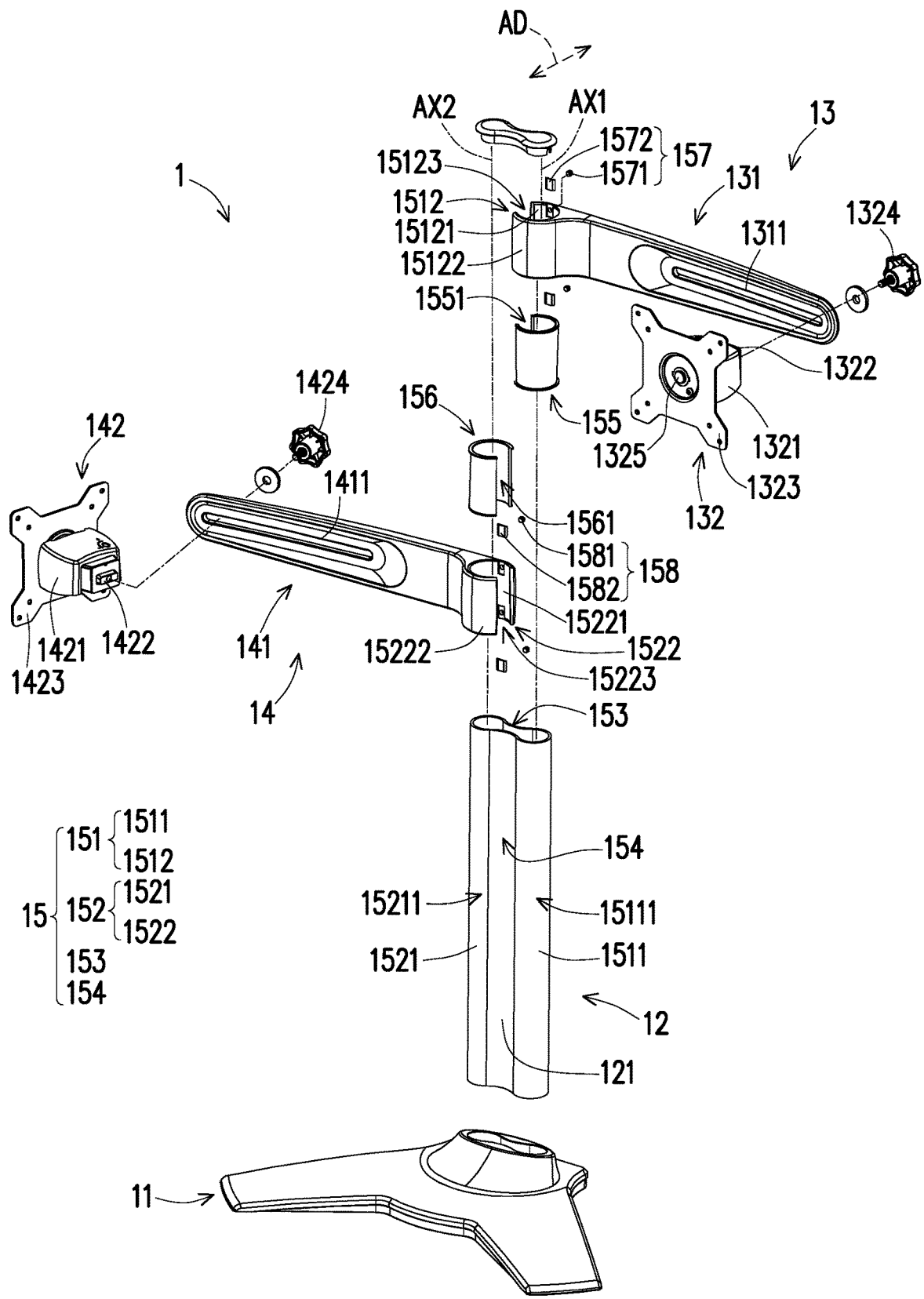
FIG. 4 is a schematic exploded view of the display stand of FIG. 2.

FIG. 2 is a schematic perspective view of a display stand to which a first display and a second display are assembled according to an embodiment of the invention. FIG. 3 is a schematic perspective view of the display stand of FIG. 2 from another perspective. FIG. 4 is a schematic exploded view of the display stand of FIG. 2.

Referring to FIGS. 2, 3, and 4, a display stand 1 of the embodiment includes a base 11, an upright rod 12, a first supporting arm 13, a second supporting arm 14 and a hinge joint member 15.

Specifically, the upright rod 12 is disposed above the base 11. The base 11 is disposed on, for example, a working plane P on the desktop. The upright rod 12 extends along a first axis AX1 and a second axis AX2, and defines a radial direction AD perpendicular to the first axis AX1 and the second axis AX2. The first supporting arm 13 is movably disposed on the upright rod 12 along the first axis AX1. The second supporting arm 14 is movably disposed on the upright rod 12 along the second axis AX2. The first supporting arm 13 and the second supporting arm 14 are respectively configured to support a display, i.e., a first display 20 and a second display 30. The hinge joint member 15 is disposed between the upright rod 12 and the first supporting arm 13 and between the upright rod 12 and the second supporting arm 14, and is configured to limit the angles at which the first supporting arm 13 and the second supporting arm 14 rotate along the radial direction AD.

With the configuration, the angles at which the user rotates the first supporting arm 13 and the second supporting arm 14 can be effectively limited to prevent the display stand 1 from being out of balance and toppling over.

In the embodiment, there is no specific limitation on the numbers of the supporting arms and the displays. For example, the numbers of the supporting arms and the displays may respectively be four or six.

In other embodiments not shown herein, the position at which the standing rod is disposed is not particularly limited. For example, the standing rod may be disposed on a wall surface or be directly inserted into a desk/table.

Figure 5:
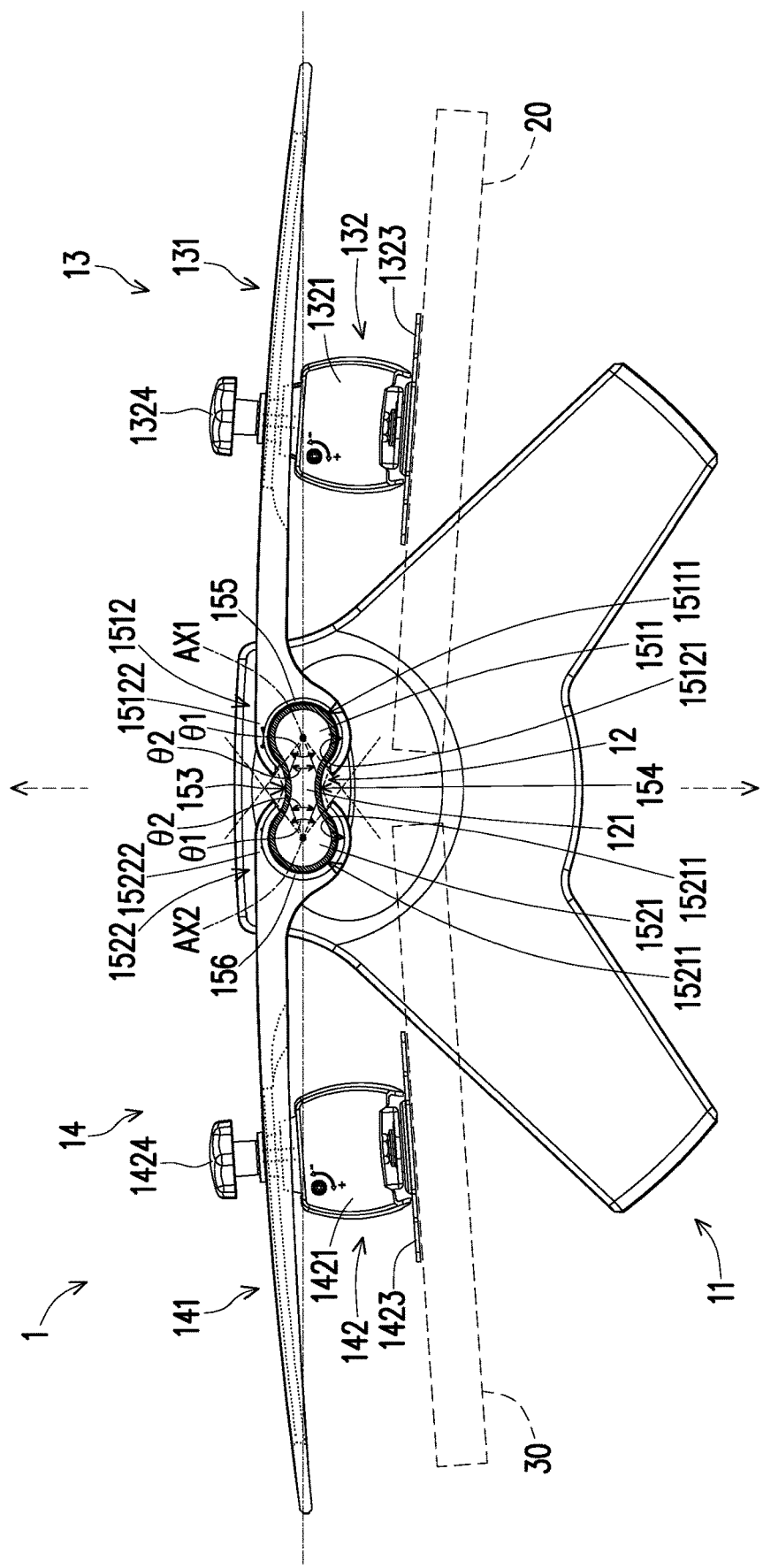
FIG. 5 is a schematic top view of the display stand to which a first display and a second display are assembled.
Figure 6:
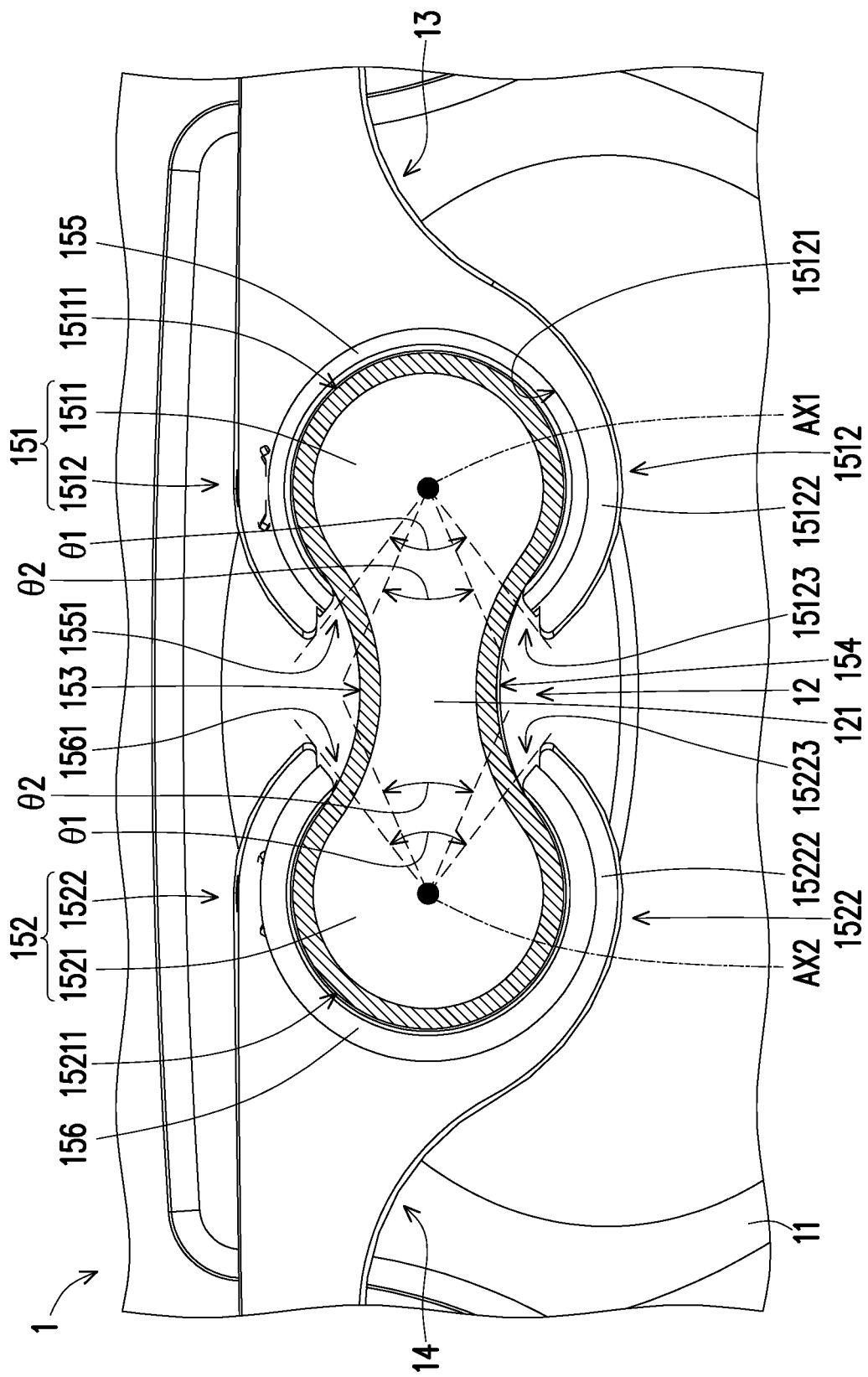
FIG. 6 is a schematic partial enlarged view of the display stand of FIG. 5.

FIG. 5 is a schematic top view of the display stand to which a first display and a second display are assembled. FIG. 6 is a schematic partial enlarged view of the display stand of FIG. 5. Referring to FIGS. 4, 5, and 6, a cross-section of the upright rod 12 of the embodiment is a calabash shape. The hinge joint member 15 includes a first knuckle 151, a second knuckle 152, a first stopping surface 153, and a second stopping surface 154. The first knuckle 151 is disposed between the upright rod 12 and the first supporting arm 13. The second knuckle 152 is disposed between the upright rod 12 and the second supporting arm 14.

Specifically, the first knuckle 151 has a first cylinder 1511 and a first pivoting seat 1512. The first cylinder 1511 is pivotally accommodated in the first pivoting seat 1512, such that the first supporting arm 13 is pivotally rotatable with respect to the radial direction AD of the first axis AX1.

Furthermore, the first pivoting seat 1512 has a first hollow tube 15122 and a first opening slot 15123. The first hollow tube 15122 is substantially tube-like. The first hollow tube 15122 is sleeved on the first cylinder 1511, and may be reciprocally slidable along the first axis AX1. The first opening slot 15123 is formed at the first hollow tube 15122, and extends along the first axis AX1. In other words, the first hollow tube 15122 has a C-shaped cross-section.

In addition, the first cylinder 1511 has a first outer convex circular arc surface 15111. The first pivoting seat 1512 has a first inner concave circular arc surface 15121. In addition, the shape of the first outer convex circular arc surface 15111 of the first cylinder 1511 and the shape of the first inner concave circular arc surface 15121 of the first pivoting seat 1512 match with each other.

On the other hand, the hinge joint member 15 further has a first hollow bushing 155. The first hollow bushing 155 is substantially tube-like, and is clamped between the first cylinder 1511 and the first hollow tube 15122 of the first pivoting seat 1512. The first hollow bushing 155 has a first perforated groove 1551 extending along the first axis AX1. In other words, the first hollow bushing 155 has a C-shaped cross-section, thereby changing the extent of clamping the upright rod 12.

Besides, the hinge joint member 15 further has a plurality of first adjustment members 157. Each of the first adjustment members 157 includes a first screw 1571 and a first clamping pad 1572. The first clamping pad 1572 is disposed on the first screw 1571. The first screw 1571 passes through and is fastened into the first pivoting seat 1512. By rotating the first screw 1571, the first clamping pad 1572 moves along the radial direction AD, so as to adjust the extent of clamping the first cylinder 1511 by the first pivoting seat 1512. When the first supporting arm 13 needs to be adjusted to move along the first axis AX1 or the radial direction AD, the first screw 1571 may be loosened for making the adjustment.

Similarly, the second knuckle 152 has a second cylinder 1521 and a second pivoting seat 1522. The second cylinder 1521 is pivotally accommodated in the second pivoting seat 1522, such that the second supporting arm 14 is pivotally rotatable with respect to the radial direction AD of the second axis AX2.

More specifically, the second pivoting seat 1522 has a second hollow tube 15222 and a second opening slot 15223. The second hollow tube 15222 is substantially tube-like. The second hollow tube 1522 is sleeved on the second cylinder 1521, and may be reciprocally slidable along the second axis AX2. The second opening slot 15223 is formed at the second hollow tube 1522, and move along the second axis AX2. In other words, the first hollow bushing 155 has a C-shaped cross-section.

Besides, the second cylinder 1521 has a second outer convex circular arc surface 15211. The second pivoting seat 1522 has a second inner concave circular arc surface 15221. The second outer convex circular arc surface 15211 of the second cylinder 1521 and the inner concave circular arc surface 15221 of the second pivoting seat 1522 match with each other.

On the other hand, the hinge joint member 15 further has a second hollow bushing 156. The second hollow bushing 156 is substantially tube-like, and is clamped between the second cylinder 1521 and the second hollow tube 15222 of the second pivoting seat 1522. The second hollow bushing 156 has a second perforated groove 1561 along the second axis AX2. In other words, the second hollow bushing 156 has a C-shaped cross-section, thereby changing the extent of clamping the upright rod 12.

On the other hand, the hinge joint member 15 further has a plurality of second adjustment members 158. Each of the second adjustment members 158 includes a second screw 1581 and a second clamping pad 1582. The second clamping pad 1582 is disposed on the second screw 1581. The second screw 1581 passes through and is fastened into the second pivoting seat 1522. By rotating the second screw 1581, the second clamping pad 1582 moves along the radial direction AD, so as to adjust the extent of clamping the first cylinder 1511 by the first pivoting seat 1512. When the second supporting arm 14 needs to be adjusted to move along the second axis AX2 or the radial direction AD, the second screw 1581 may be loosened for making the adjustment.

In the embodiment, the materials of the first hollow bushing 155 and the second hollow bushing 156 may include a polyoxymethylene (POM) material. However, the invention is not limited thereto, as long as the material can prevent the first supporting arm 13 and the second supporting arm 14 from inappropriately rubbing against or causing noise with the upright rod 12.

Referring to FIG. 4, FIG. 5 and FIG. 6, the upright rod 12 of the embodiment has a connecting plate 121. The connecting plate 121 passes through the first opening slot 15123 and the first perforated groove 1551 to be connected to the first cylinder 1511. In addition, the connecting plate 121 passes through the second opening slot 15223 and the second perforated groove 1561 to be connected to second cylinder 1521. The first stopping surface 153 and the second stopping surface 154 are respectively formed on the opposite two sides of the connecting plate 121. The first stopping surface 153 and the second stopping surface 154 are interposed between the first cylinder 1511 and the second cylinder 1521. The first pivoting seat 1512 is disposed on the first supporting arm 13. The second pivoting seat 1522 is disposed on the second supporting arm 14.

With the structure, when the first supporting arm 13 and the second supporting arm 14 move to any level, the angles at which the user rotates the first supporting arm 13 and the second supporting arm 14 can be effectively limited by the hinge joint member 15, thereby preventing the display stand 1 from being out of balance and toppling over due to an inappropriate operation of the user.

Referring FIG. 2, FIG. 3 and FIG. 4, the first supporting arm 13 has a first arm body 131 and a first hinge 132. The first arm body 131 is horizontally connected to the first pivoting seat 1512. The first hinge 132 is slidably sleeved on the first arm body 131. The first arm body 131 is horizontally disposed on a first perforated groove 1311. The first hinge 132 is slidably sleeved on the first perforated groove 1311 by a first engaging end 1322, such that first hinge 132 is horizontally, laterally and reciprocally slidable with respect to the first arm body 131.

Specifically, the first hinge 132 has a first portion 1321, a first engaging end 1322, a first fixing plate 1323, a first fastener 1324, and a first shaft 1325. The first fastener 1324 is fastened to the first engaging end 1322. The first fastener 1324 and the first portion 1321 are located on the opposite two sides of the first supporting arm 13. The first fastener 1324 and the first portion 1321 may be optionally packed to the first supporting arm 13 and not movable. When the horizontal position of the first hinge 132 needs to be adjusted, the first fastener 1324 may be loosened for making the adjustment.

Besides, the first shaft 1325 is disposed on the first portion 1321. The first fixing plate 1323 (i.e., a VESA plate) is pivotally disposed on the first shaft 1325. The first display 20 is further disposed on the first fixing plate 1323. Accordingly, the first display 20 may self-pivot through the first shaft 1325, and the first display 20 may be change between a landscape mode and a portrait mode, and horizontally slidably move on the first arm body 131 through the first display 20.

Similarly, the second supporting arm 14 has a second arm body 141 and a second hinge 142. The second arm body 141 is horizontally connected to the second pivoting seat 1522. The second hinge 142 is slidably disposed in the second arm body 141. The second arm body 141 is slidably disposed in a second perforated groove 1411. A second engaging end 1422 of the second hinge 142 is slidably disposed in the second perforated groove 1411, such that the second hinge 142 may be laterally and reciprocally slidable with respect to the second arm body 141.

Specifically, the second hinge 144 has a second portion 1421, the second engaging end 1422, a second fixing plate 1423, a second fastener 1424, and a second shaft 1425. The second fastener 1444 is fastened to the second engaging end 1442. The second fastener 1424 and the second portion 1421 are located on two opposite sides of the second supporting arm 14. The second fastener 1424 and the second portion 1421 may be optionally packed to the second supporting arm 14 and not movable. When the horizontal position of the second hinge 144 needs to be adjusted, the second fastener 1424 may be loosened for making the adjustment.

Besides, the second shaft 1425 is disposed on the second portion 1421. The second fixing plate 1423 is pivotally disposed on the second shaft 1425. The second display 30 is further disposed on the second fixing plate 1423. In other words, the second display 30 may be rotatably disposed on the second portion 1421 through the second fixing plate 1423, and the second display 30 may be horizontally slidable along the second arm body 141 through the second hinge 142.

Figure 7:
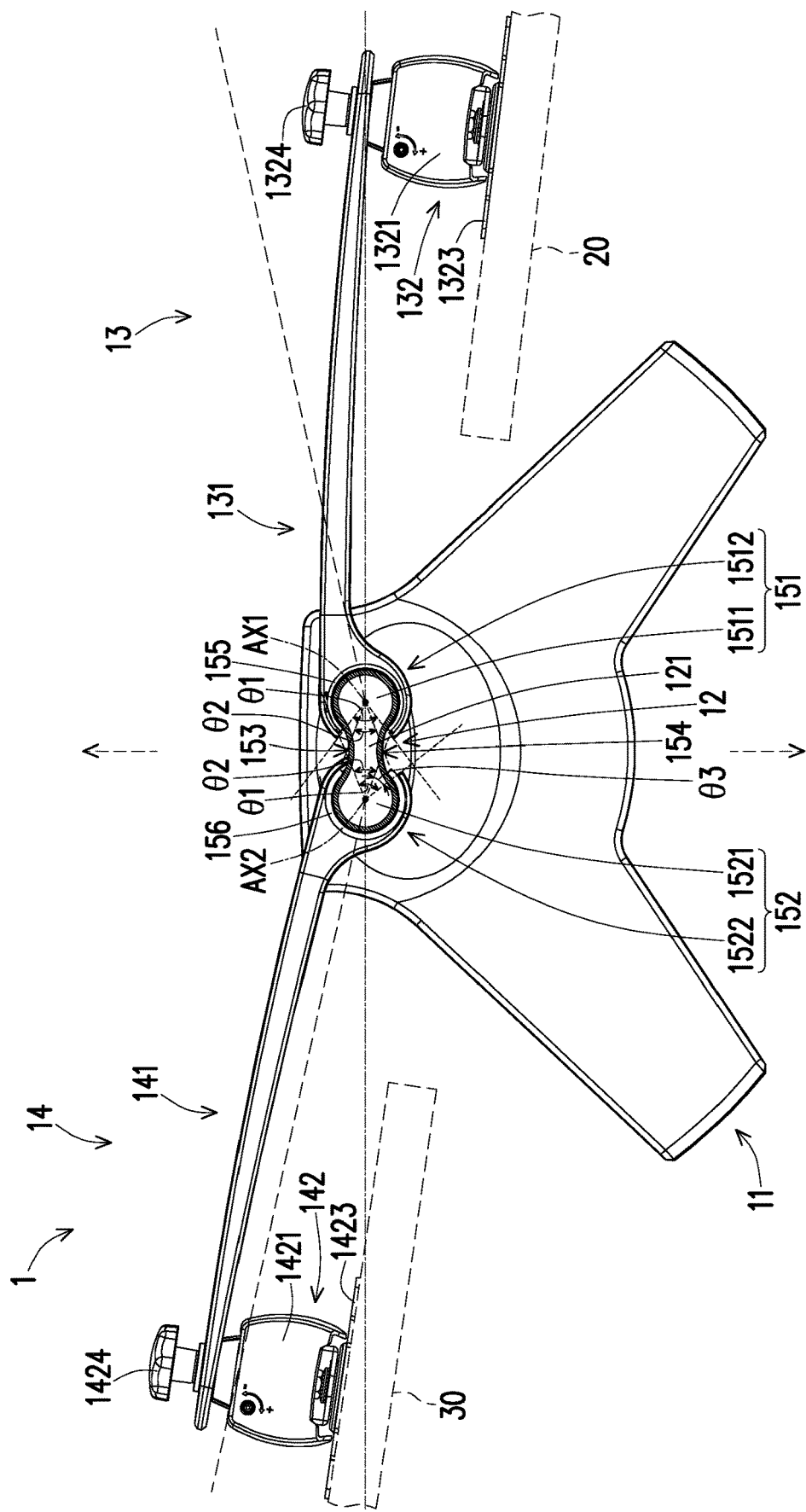
FIG. 7 is a schematic view after a second supporting arm of FIG. 5 is pivotally rotated in a first direction.
Figure 8:
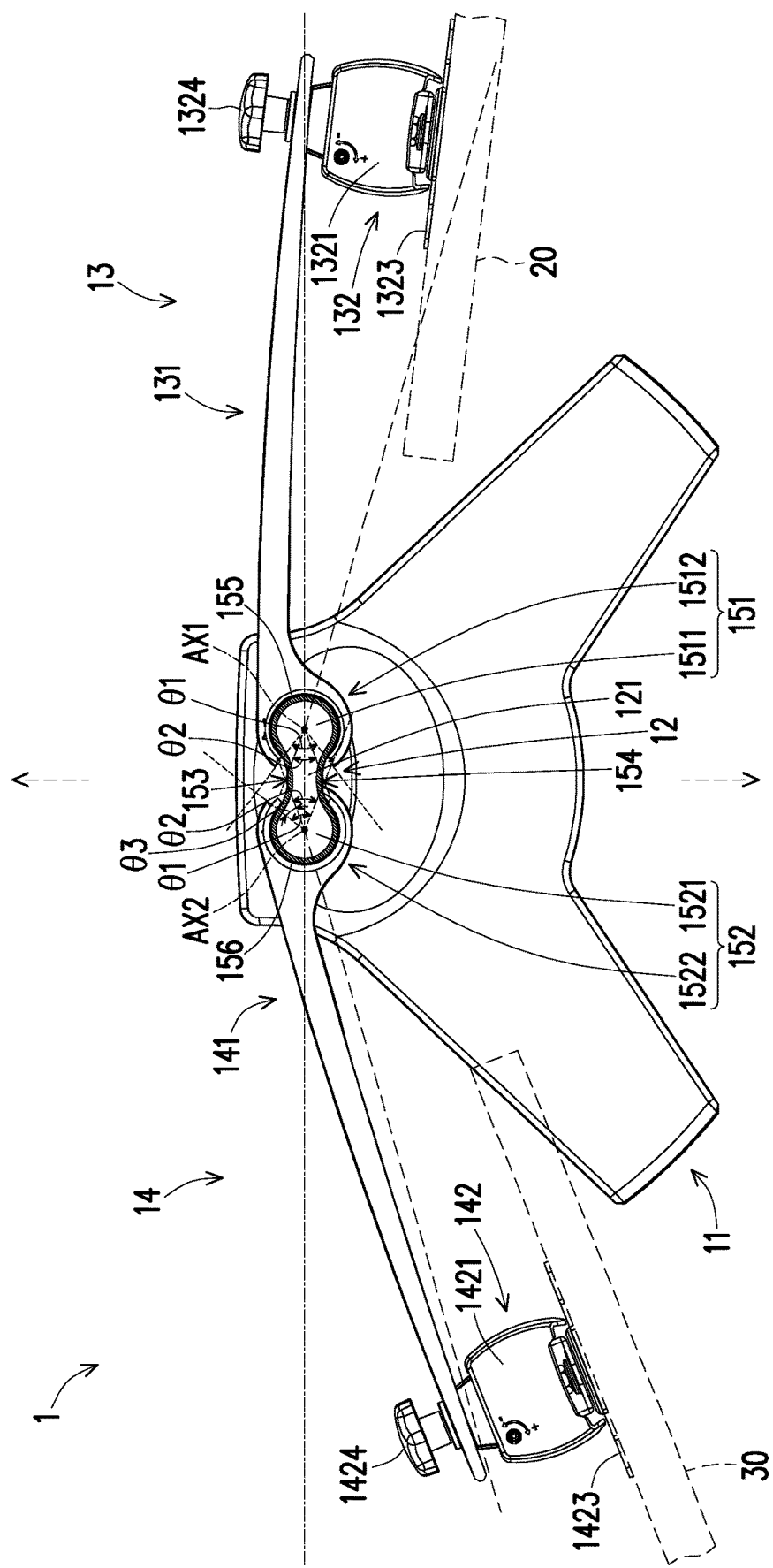
FIG. 8 is a schematic view after the second supporting arm of FIG. 5 is pivotally rotated in a second direction.

FIG. 7 is a schematic view after a second supporting arm of FIG. 5 is pivotally rotated in a first direction. FIG. 8 is a schematic view after the second supporting arm of FIG. 5 is pivotally rotated in a second direction. FIG. 7 shows an extremity, which is defined as a first position, of the pivotal rotation (backward horizontal rotation) of the second supporting arm 14 with respect to the upright rod 12 in the first direction along the radial direction AD in the embodiment. FIG. 8 shows an extremity, which is defined as a second position, of the pivotal rotation (forward horizontal rotation) of the first supporting arm 13 with respect to the upright rod 12 in the second direction along the radial direction AD in the embodiment.

Referring to FIGS. 2, 4, 5, and 6, in the embodiment, a first angle θ1 is defined from the second inner concave circular arc surface 15221 of the embodiment from the two ends with the central axis as center along the radial direction AD with respect to the upright rod 12. The first central axis θ1 is approximately between 40° and 60°.

In addition, a second angle θ2 is defined between a border between the second inner concave circular arc surface 15221 and the first stopping surface 153 and a border between the second outer convex circular arc surface 15211 and the second stopping surface 154 with the second axis AX2 as the center. The second central axis θ2 is approximately between 15° and 30°.

As illustrated in FIG. 6, the radius corresponding to the inner concave circular arc surface 15221 is greater than the radius corresponding to the outer convex circular arc surface 15211, such that the first central axis θ1 defined by the second inner concave circular arc surface 15221 is greater than the second central axis θ2 commonly defined by inner concave circular arc surface 15211, a first stopping surface 153, and a second stopping surface 154.

Here, it is defined that the rotation of the second supporting arm 14 along the radial direction AD between the first position and the second position has a maximum radial pivoting angle θ3, and the radial pivoting angle θ3 is derived by subtracting the second angle θ2 from the first angle θ1. In general, the maximum radial pivoting angle θ3 is approximately between 20° and 40°. However, the invention is not limited thereto.

In other words, a first reference line connected between a first point on the inner concave circular arc surface 15221 and a reference point on the first axis AX1 or the second axis AX2 and a second reference line connected between a second point on the inner concave circular arc surface 15221 and the reference point on the first axis AX1 or the second axis AX2 define a first angle θ1 in the radial direction AD with respect to the first axis AX1 or the second axis AX2. A third reference line connected between a third point on the first stopping surface 153 and the reference point on the first axis AX1 or the second axis AX2 and a fourth reference line connected between a fourth point on the second stopping surface 154 and the reference point on the first axis AX1 or the second axis AX2 define a second angle θ2 in the radial direction AD with respect to the first axis AX1 or the second axis AX2. The first point contacts the third point while the first supporting arm 13 or the second supporting arm 14 is at the first position and the second point contacts the fourth point while the supporting first supporting arm 13 or the second supporting arm 14 is at the second position. The maximum radial pivoting angle θ3 range for rotation of the first supporting arm 13 or the second supporting arm 14 along the radial direction AD between the first position and the second position is a difference between a value of the first angle θ1 and a value of the second angle θ2.

When the second supporting arm 14 is moved toward the first direction as shown in FIG. 7, and the first tenon 154 abuts against the first stopping surface 153, the second supporting arm 14 is limited at the first position, and the second supporting arm 14 is rotated the maximum radial pivoting angle θ3.

When the second supporting arm 14 is moved toward the second direction as shown in FIG. 8, and the second pivoting seat 1522 abuts against the second stopping surface 154, the second supporting arm 14 is limited at the second position, and the second supporting arm 14 is rotated the maximum radial pivoting angle θ3.

Indeed, the second supporting arm 14 may be fixed at any angle between the first position and the second position.

Also, the operation mechanism of the first supporting arm 13 is the same as the operation mechanism of the second supporting arm 14. Therefore, details in this regard will not be repeated in the following.

With the configuration, the display stand 1 of the embodiment is prevented from toppling over when the first supporting arm 13 and the first display 20 and/or the second supporting arm 14 and the second display 30 are pivotally rotated an inappropriate angle.

Figure 9:
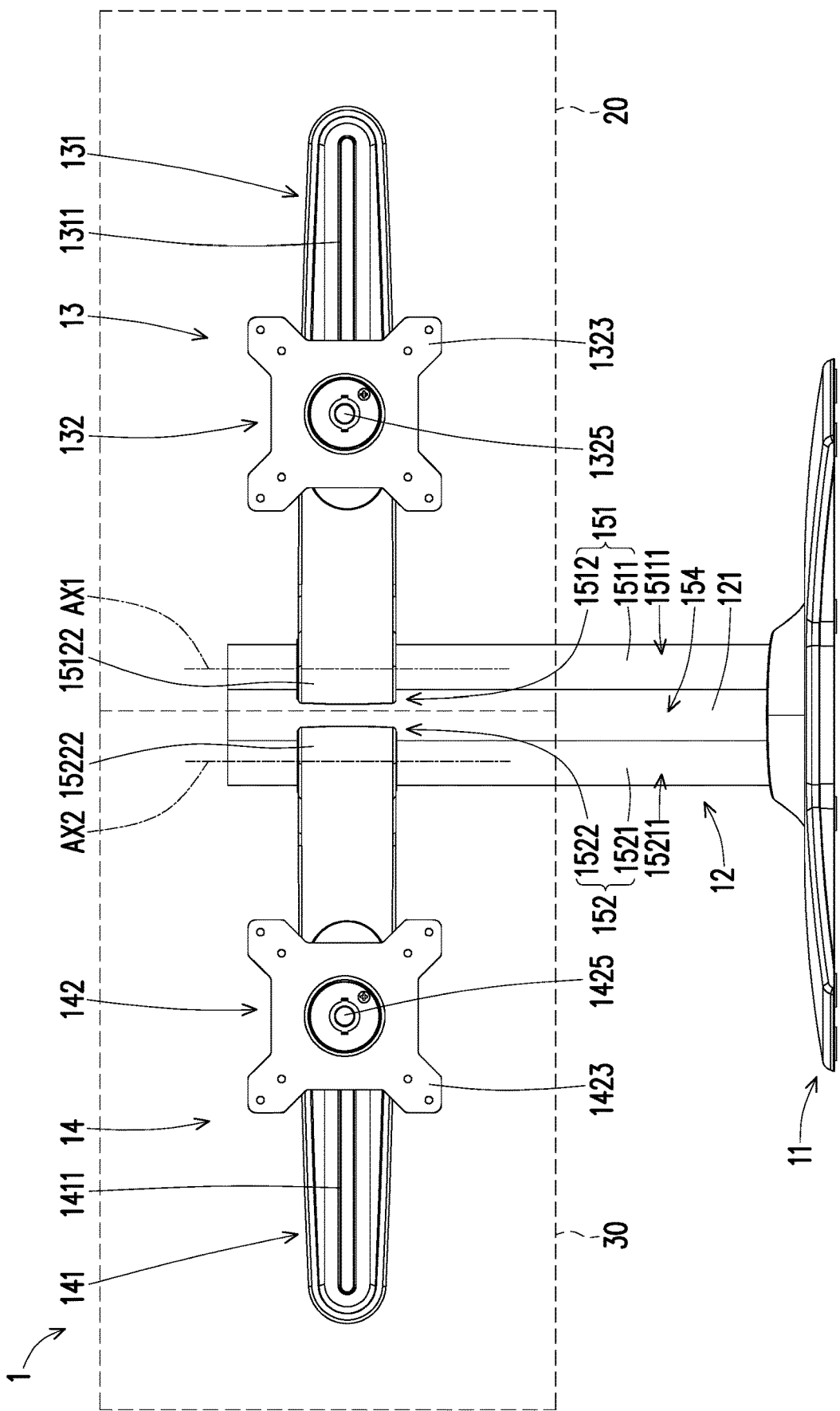
FIG. 9 is a schematic front view of the display stand of FIG. 2 to which the first display and the second display are assembled.

FIG. 9 is a schematic front view of the display stand of FIG. 2 to which the first display and the second display are assembled. Referring to FIGS. 3, 4, and 9, the long sides of the first display 20 and the second display 30 may be arranged horizontally (i.e., both in landscape mode). At this time, the first supporting arm 13 and the second supporting arm 14 are at the same height. The first hinge 132 is at one end close to the upright rod 12 in the first perforated groove 1311, and the second hinge 142 is at one end close to the upright rod 12 in the second perforated groove 1411.

Figure 10:
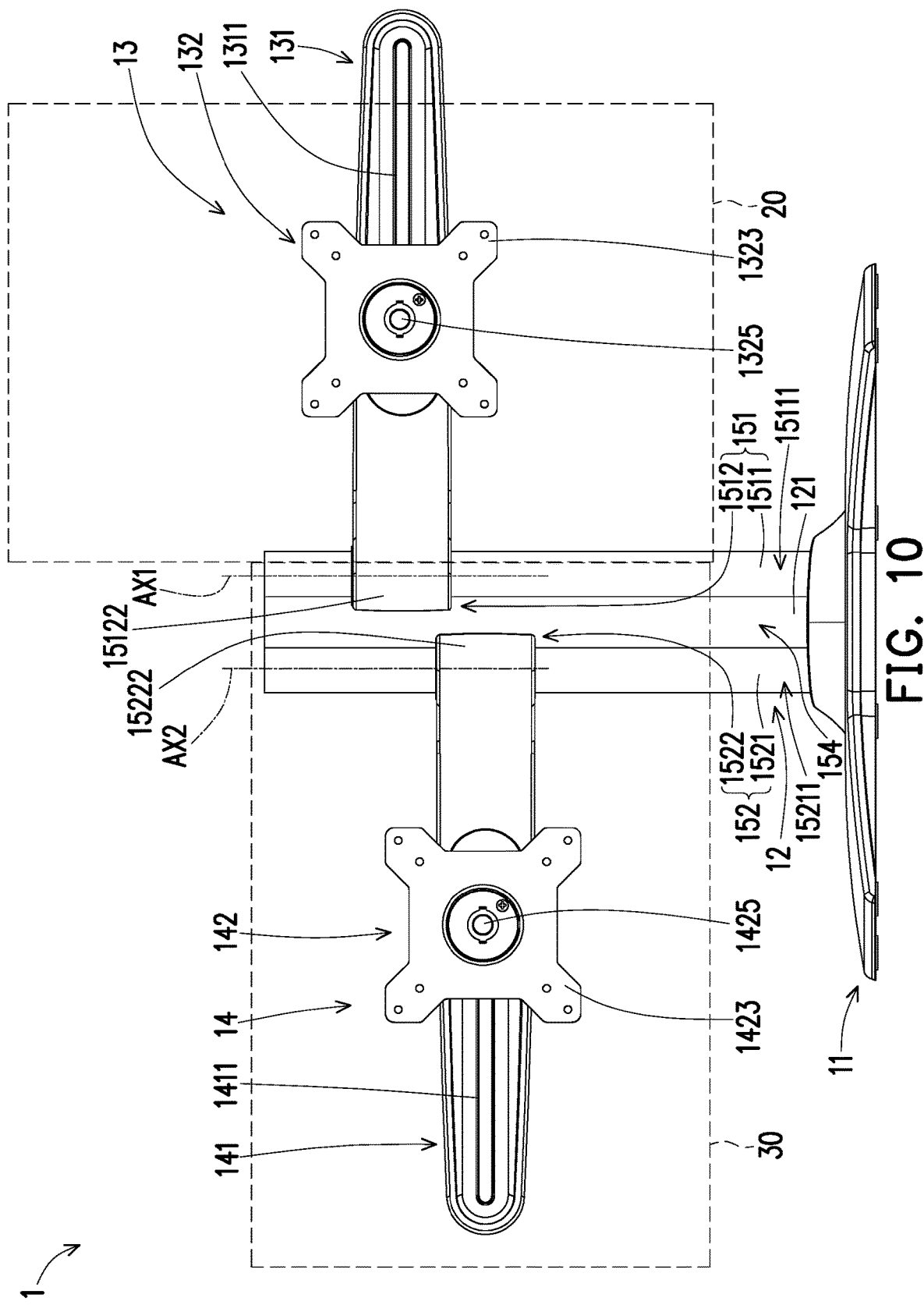
FIG. 10 is a schematic view after a second supporting arm of FIG. 9 slides and the first display is rotated.

FIG. 10 is a schematic view after a second supporting arm of FIG. 9 slides and the first display is rotated. Referring to FIGS. 3, 9, and 10, when the first display 20 is in the portrait mode, and the second display 30 is in the landscape mode, the first supporting arm 13 of this embodiment may slide up and down on the first axis AX1, and the second supporting arm 14 of this embodiment may slide up and down on the second axis AX2. The second supporting arm 14 may slide toward the base 11 along the central axis AX, as shown in FIG. 10, so as to lower the height of the second display 30. In addition, the first fixing plate 1323 may be rotated to arrange the long side of the first display 20 vertically. In the state shown in FIG. 10, the bottom of the first display 20 and the bottom of the second display 30 may be aligned to each other.

Figure 11:
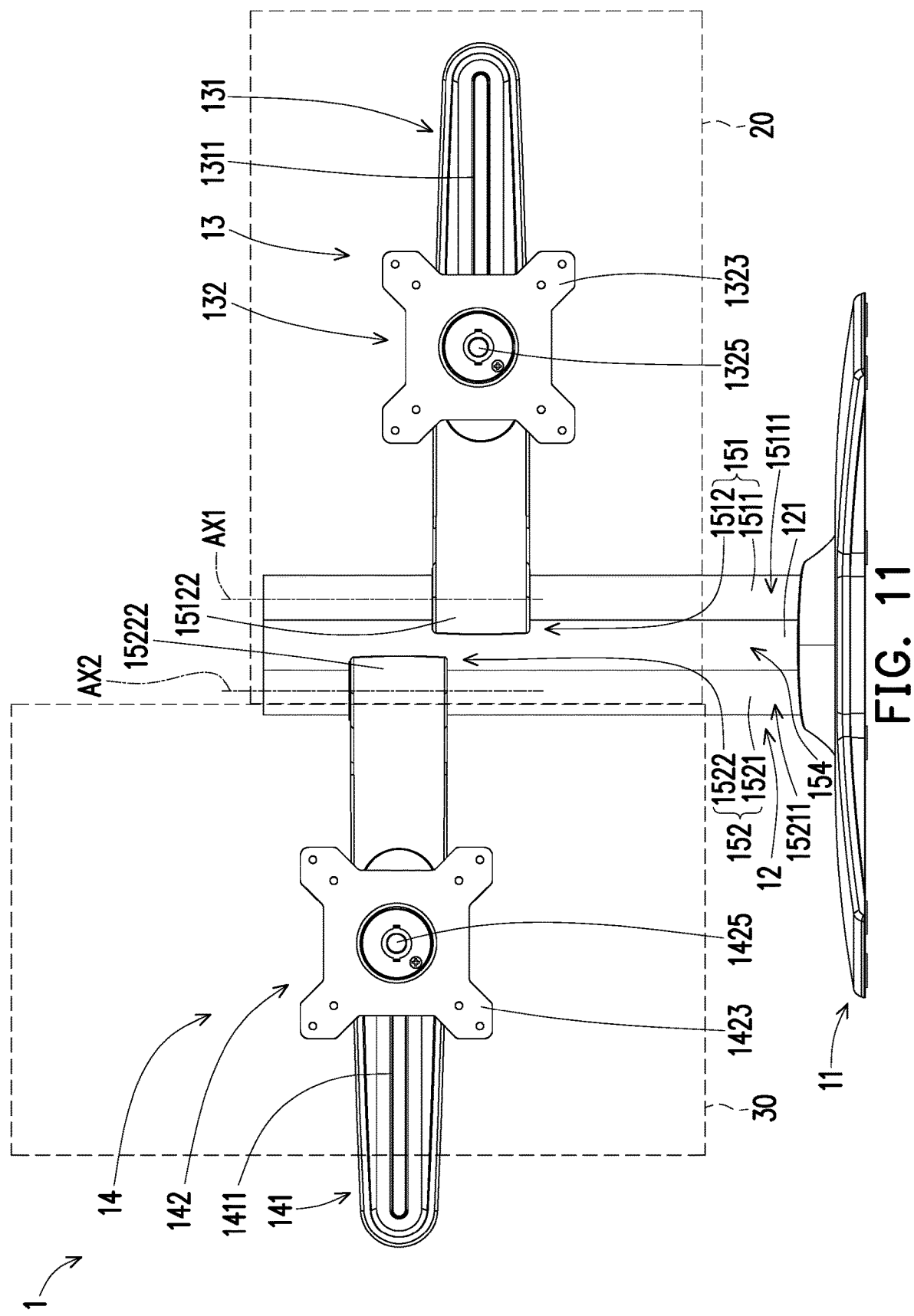
FIG. 11 is a schematic view after the first supporting arm and the second supporting arm of FIG. 9 slide and the second display is rotated.

FIG. 11 is a schematic view after the first supporting arm and the second supporting arm of FIG. 9 slide and the second display is rotated. Referring to FIGS. 3, 9, and 11, when the first display 20 is in the portrait mode, and the second display 30 is in the landscape mode, the first supporting arm 13 of this embodiment may slide toward the base 11 from the position illustrated in FIG. 9 along the first axis AX1 to the position illustrated in FIG. 11, so as to lower the height of the second display 30. In addition, the second fixing plate 1423 may be rotated to arrange the long side of the second display 30 vertically. In the state shown in FIG. 11, the bottom of the first display 20 and the bottom of the second display 30 may be aligned to each other.

Figure 12:
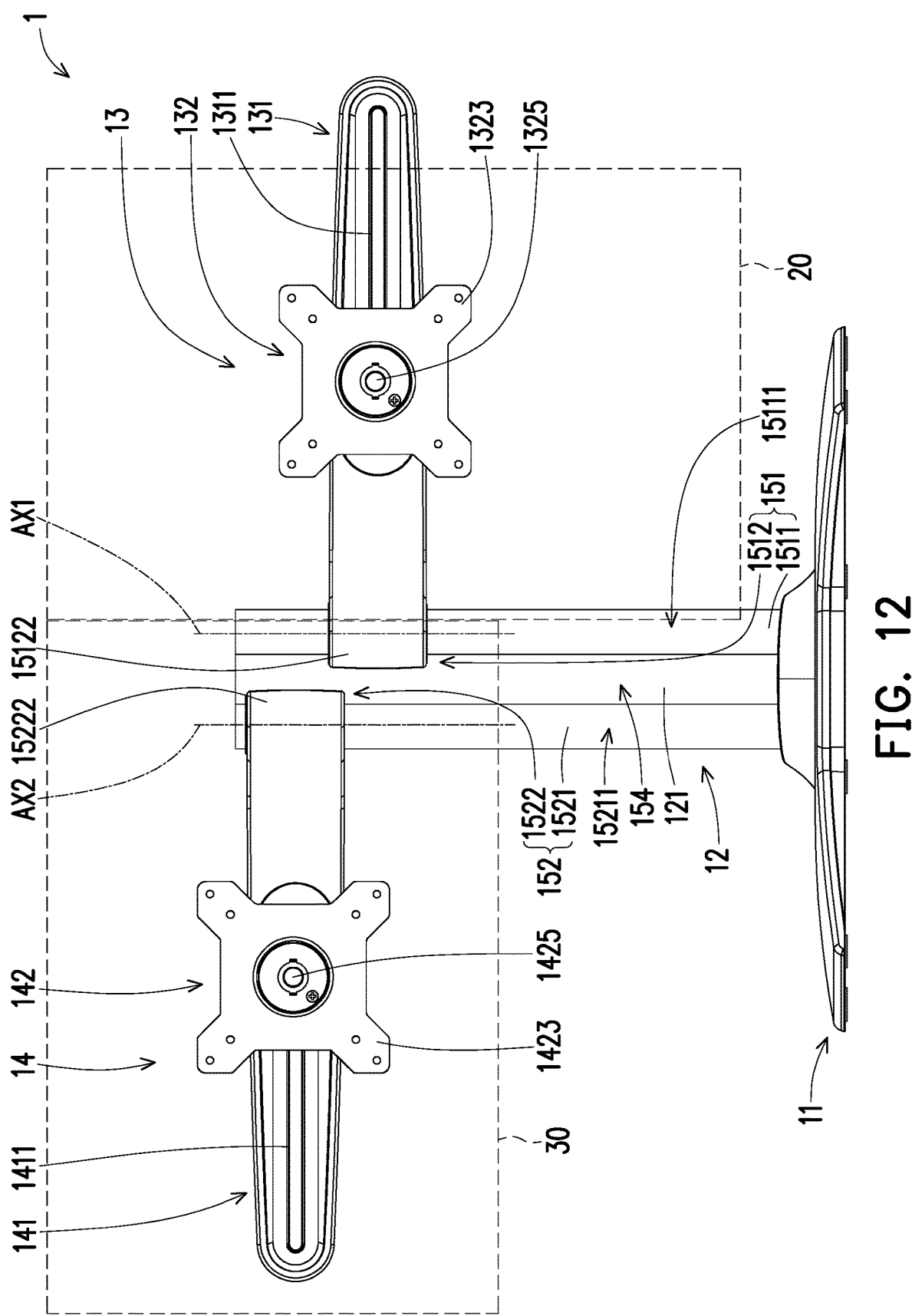
FIG. 12 is a schematic view after the first supporting arm and the second supporting arm of FIG. 9 slide and the first display is rotated.

FIG. 12 is a schematic view after the first supporting arm and the second supporting arm of FIG. 9 slide and the first display is rotated. Referring to FIGS. 3, 11, and 12, the first supporting arm 13 slides away from the base 11 from the position illustrated in FIG. 11 along the first axis AX1 to the position illustrated in FIG. 12, and a second supporting arm 14 slides away from the base 11 from the position illustrated in FIG. 12 along the second axis AX2 to the position illustrated in FIG. 12, such that the heights of the position of the first display 20 and the second display 30 may be lifted to upper heights. The first fixing plate 1323 may be rotated to arrange the long side of the first display 20 perpendicularly. The second fixing plate 1423 may be rotated to arrange the long side of the second display 30 horizontally. In the state shown in FIG. 12, the top of the first display 20 and the top of the second display 30 may be aligned to each other.

In addition, FIGS. 9 to 12 schematically show four different usage states of the display stand 1. The user may adjust the display stand 1 to the states not shown in FIGS. 9 to 12 according to his/her needs. For example, the first supporting arm 13 may be vertically moved along the first axis AX1 to be adjusted to arbitrary positions on the upright rod 12, and the second supporting arm 14 may be vertically moved along the second axis AX2 to be adjusted to arbitrary positions on the upright rod 12. The first supporting arm 13 may be horizontally pivotally rotated along the radial direction AD to arbitrary positions on the upright rod 12, and the second supporting arm 14 may be horizontally pivotally rotated along the radial direction AD to arbitrary positions on the upright rod 12. The first hinge 132 may horizontally slide to an arbitrary position on the first perforated groove 1311, and the second hinge 142 may horizontally slide to an arbitrary position on the second perforated groove 1411. The first fixing plate 1323 may be rotated to an arbitrary position on the first portion 1321, and the second fixing plate 1423 may be rotated to an arbitrary position on the second portion 1421. Accordingly, the user may adjust the positions and the angles of the first display 20 and the second display 30 based on his/her needs, so the multi-display stand 1 of the embodiment is convenient to use.

Figure 13:
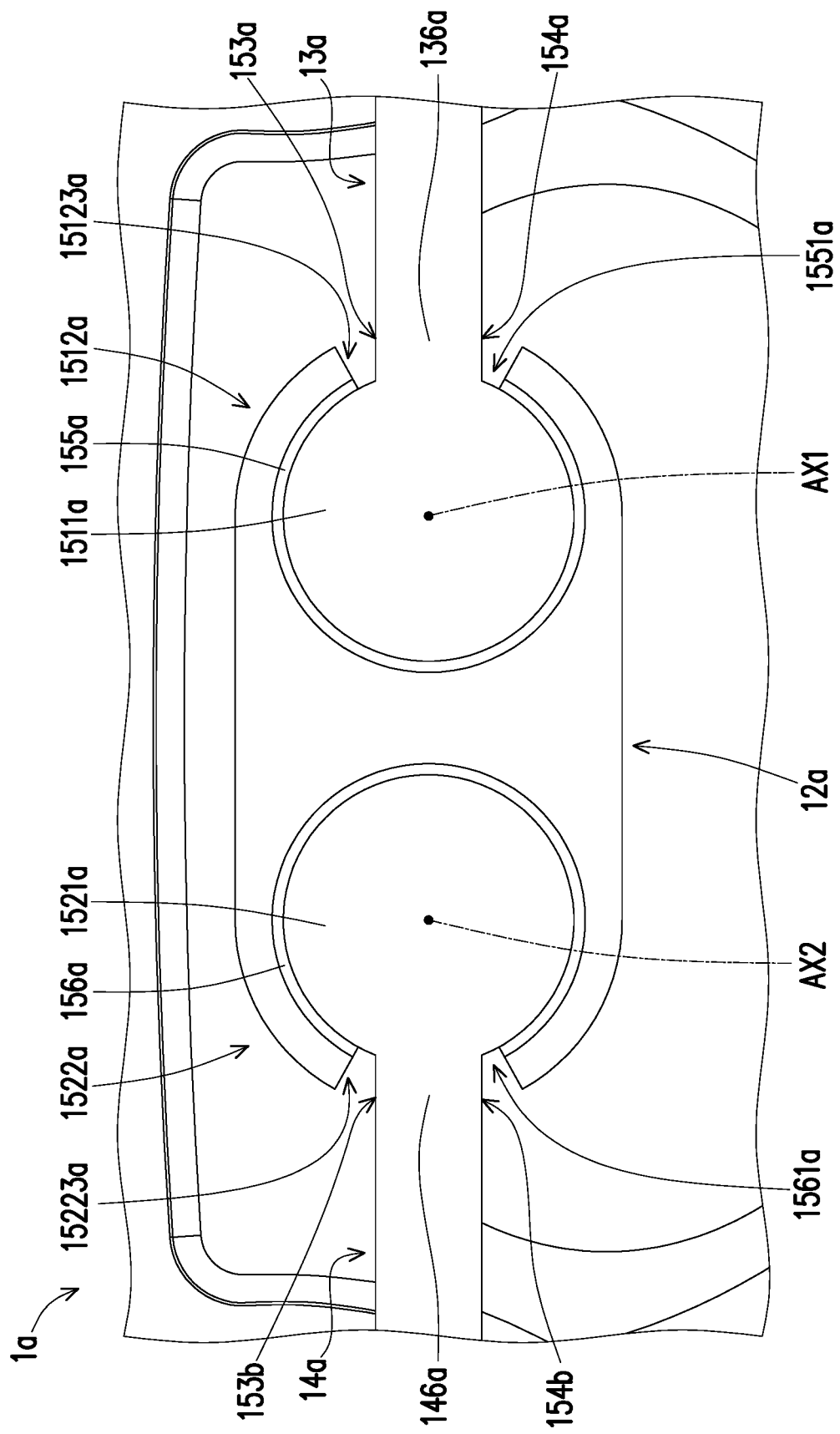
FIG. 13 is a schematic view of a display stand according to the second embodiment of the invention.

FIG. 13 is a schematic view of a display stand according to the second embodiment of the invention. Referring to FIG. 13, in a display stand 1a of this embodiment, a first pivoting seat 1512a and a second pivoting seat 1522a are formed on an upright rod 12a. A first supporting arm 13a has a first arm plate 136a. The first arm plate 136a passes through a first opening slot 15123a of the first pivoting seat 1512a and a first perforated groove 1551a of a first hollow bushing 155a to be connected to a first cylinder 1511a. The first stopping surface 153a and the second stopping surface 154a are respectively formed on the opposite two sides of the first arm plate 136a. A second supporting arm 14a has a second arm plate 146a. The second arm plate 146a passes through a second opening slot 15223a of a second pivoting seat 1522a and a second perforated groove 1561a of a second hollow bushing 156a to be connected to a second cylinder 1521a. A first stopping surface 153b and a second stopping surface 154b are respectively formed on the opposite two sides of the second arm plate 146a.

Figure 14:
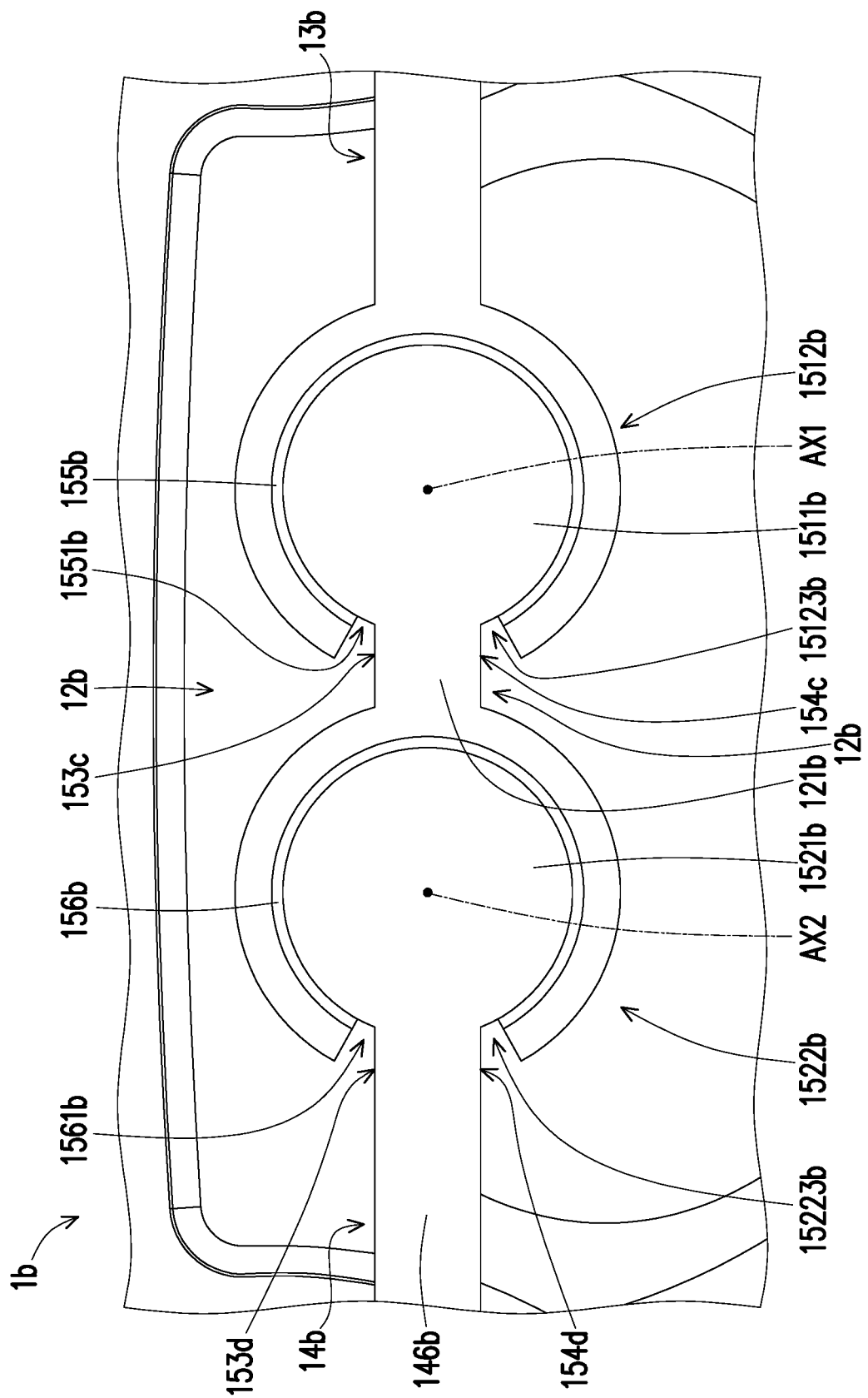
FIG. 14 is a schematic view of a display stand according to the third embodiment of the invention.

FIG. 14 is a schematic view of a display stand according to the third embodiment of the invention. Referring to FIG. 14, in a display stand 1b of this embodiment, an upright rod 12b has a connecting plate 121b. One side of the connecting plate 121b passes through a first opening slot 15123b of the first pivoting seat 1512b and a first perforated groove 1551b of a first hollow bushing 155b to be connected to a first cylinder 1511b. The other side of the connecting plate 121b is connected to a second pivoting seat 1522b. The first pivoting seat 1512b is disposed on a first supporting arm 13b. A second supporting arm 14b has an arm plate 146b. The arm plate 146b passes through the second opening slot 15223b of the second pivoting seat 1522b and a second perforated groove 1561b of a second hollow bushing 156b to be connected to a second cylinder 1521b. A first stopping surface 153c and a second stopping surface 154c are formed on the opposite two sides of the connecting plate 121b. A first stopping surface 153d and a second stopping surface 154d are respectively formed on the opposite two sides of the arm plate 146b.

Figure 15:
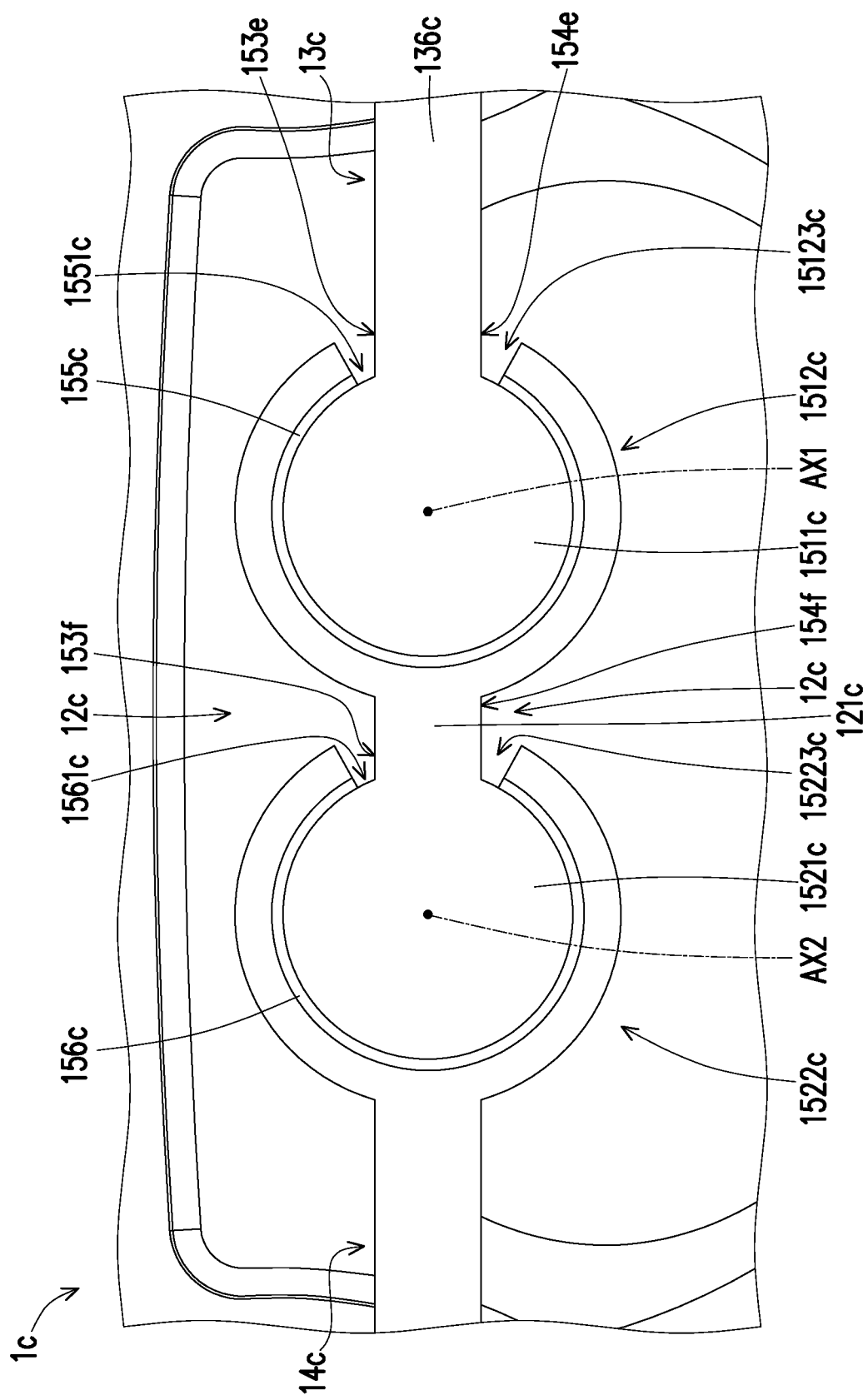
FIG. 15 is a schematic view of a display stand according to the fourth embodiment of the invention.

FIG. 15 is a schematic view of a display stand according to the fourth embodiment of the invention. Referring to FIG. 15, in a display stand 1c of this embodiment, an upright rod 12c has a connecting plate 121c. One side of the connecting plate 121c passes through a second opening slot 15223c of the second pivoting seat 1522b and a second perforated groove 1561b of a second hollow bushing 156b to be connected to a second cylinder 1521b. The other side of the connecting plate 121c is connected to a first pivoting seat 1512c. The second pivoting seat 1522c is disposed on a second supporting arm 14c. A first supporting arm 13c has an arm plate 136c. The arm plate 136c passes through a first opening slot 15123c of the first pivoting seat 1512c and a first perforated groove 1551c of a first hollow bushing 155c to be connected to a first cylinder 1511c. A first stopping surface 153e and a second stopping surface 154e are formed on the opposite two sides of the arm plate 136c. A first stopping surface 153f and a second stopping surface 154f are respectively formed on the opposite two sides of the connecting plate 121c.

In view of the above, in the display stand of the present invention, the first cylinder is pivotally accommodated in the first pivoting seat, such that the first supporting arm is pivotally rotatable along a radial direction with respect to the first axis, and stops at any position between the first position and the second position. The second cylinder is pivotally accommodated in the second pivoting seat, such that the second supporting arm is pivotally rotatable along a radial direction with respect to the second axis, and stops at any position between the first position and the second position. When the first supporting arm is at the first position, the first pivoting seat abuts against the first stopping surface. When the first supporting arm is at the second position, the first pivoting seat abuts against the second stopping surface. When the second supporting arm is at the first position, the second pivoting seat abuts against the first stopping surface. When the second supporting arm is at the second position, the second pivoting seat abuts against the second stopping surface. Accordingly, the angles at which the user rotates the supporting arms can be effectively limited to prevent the display stand from being out of balance and toppling over.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display stand, configured to support a plurality of displays, the display stand comprising:
 an upright rod, extending along an axis;
 a first supporting arm, configured to support a first display;
 a second supporting arm, configured to support a second display; and
 a hinge joint member, comprising:

a first knuckle, disposed on the upright rod and the first supporting arm, and having a first cylinder and a first pivoting seat, wherein the first cylinder is pivotally accommodated in the first pivoting seat, and the first supporting arm is pivotally rotatable with respect to a radial direction of the axis, and stops at any position between a first position and a second position;

a second knuckle, disposed on the upright rod and the second supporting arm, and having a second cylinder and a second pivoting seat, wherein the second cylinder is pivotally accommodated in the second pivoting seat, and the second supporting arm is pivotally rotatable with respect to the radial direction of the axis, and stops at any position between a first position and a second position;

a first stopping surface; and a second stopping surface;

wherein, when the first supporting arm is at the first position, the first pivoting seat abuts against the first stopping surface, when the first supporting arm is at the second position, the first pivoting seat abuts against the second stopping surface, when the second supporting arm is at the first position, the second pivoting seat abuts against the first stopping surface, when the second supporting arm is at the second position, the second pivoting seat abuts against the second stopping surface, wherein the first pivoting seat and the second pivoting seat respectively have a hollow tube and an opening slot formed at the hollow tube, the hollow tube and the opening slot of the first pivoting seat extend along the axis, the first cylinder is accommodated in the hollow tube of the first pivoting seat and is reciprocally slidable along the axis, the hollow tube and the opening slot of the second pivoting seat extend along the axis, and the second cylinder is accommodated in the hollow tube of the second pivoting seat and is reciprocally slidable along the axis, wherein the hinge joint member further has two hollow bushings, wherein one of the hollow bushings is clamped between the first cylinder and the first pivoting seat, wherein the other hollow bushing is clamped between the second cylinder and the second pivoting seat, and wherein each of the hollow bushings respectively has a perforated groove extending along the axis.

2. The display stand as claimed in claim 1, wherein the first pivoting seat is disposed on the first supporting arm, and the second pivoting seat is disposed on the second supporting arm, and wherein the upright rod has a connecting plate, the connecting plate passes through the opening slots and the perforated grooves and connects the first cylinder and the second cylinder, and the first stopping surface and the second stopping surface are respectively formed on the opposite two sides of the connecting plate and are interposed between the first cylinder and the second cylinder.

3. The display stand as claimed in claim 1, wherein the first supporting arm has an arm plate, and the arm plate of the first supporting arm passes through the opening slot and the perforated groove to be connected to the first cylinder, wherein the second supporting arm has an arm plate, and the arm plate of the second supporting arm passes through the opening slot and the perforated groove to be connected to the second cylinder, wherein the first stopping surface and the second stopping surface are respectively formed on the opposite two sides of the arm plate, and wherein the first pivoting seat and the second pivoting seat are formed on the upright rod.

4. The display stand as claimed in claim 1, wherein the upright rod has a connecting plate, one side of the connecting plate passes through the opening slot and the perforated groove to be connected to the first cylinder, the other side of the connecting plate is connected to the second pivoting seat, and the first pivoting seat is disposed on the first supporting arm, wherein the second supporting arm has an arm plate, and the arm plate of the second supporting arm passes through the opening slot and the perforated groove to be connected to the second cylinder, and wherein the first stopping surface and the second stopping surface are respectively formed on the opposite two sides of the arm plate and the connecting plate.

5. The display stand as claimed in claim 1, wherein the hinge joint member further has a plurality of adjustment members, and the adjustment members are disposed to the first pivoting seat and the second pivoting seat and configured to adjust an extent of clamping with respect to the first cylinder and the second cylinder.

6. The display stand as claimed in claim 5, wherein each of the adjustment members respectively comprises a screw and a clamping pad, the clamping pad is correspondingly disposed on the screw, and the clamping pad moves along the radial direction of the axis by rotating the corresponding screw.

7. The display stand as claimed in claim 1, wherein the first cylinder has an outer convex circular arc surface, the first pivoting seat has an inner concave circular arc surface, and the outer convex circular arc surface of the first cylinder and the inner concave circular arc surface of the first pivoting seat match with each other, and wherein the second cylinder has an outer convex circular arc surface, the second pivoting seat has an inner concave circular arc surface, and the outer convex circular arc surface of the second cylinder and the inner concave circular arc surface of the second pivoting seat match with each other.

8. The display stand as claimed in claim 7, wherein a first reference line connecting between a first point on the inner concave circular arc surface and a reference point on the axis and a second reference line connecting between a second point on the inner concave circular arc surface and the reference point on the axis define a first angle in the radial direction with respect to the axis, a third reference line connecting between a third point on the first stopping surface and the reference point on the axis and a fourth reference line connecting between a fourth point on the second stopping surface and the reference point on the axis define a second angle in the radial direction with respect to the axis, the first point contacts the third point while the first supporting arm or the second supporting arm is at the first position and the second point contacts the fourth point while the supporting first supporting arm or the second supporting arm is at the second position, and the maximum radial pivoting angle range for rotation of the first supporting arm or the second supporting arm along the radial direction between the first position and the second position is a difference between a value of the first angle and a value of the second angle.

9. The display stand as claimed in claim 8, wherein the maximum radial pivoting angle of the first supporting arm or the second supporting arm in the radial direction with respect to the axis is between 20° and 40°.

10. The display stand as claimed in claim 7, wherein a radius corresponding to the inner concave circular arc surface is greater than a radius corresponding to the outer convex circular arc surface.

11. The display stand as claimed in claim 7, wherein the first supporting arm and the second supporting arm optionally move along the axis.

12. The display stand as claimed in claim 7, wherein the first supporting arm has a first arm body and a first hinge, and the first hinge is slidably disposed on the first arm body and is configured to support the first display, and wherein the second supporting arm has a second arm body and a second hinge, and the second hinge is slidably disposed on the second supporting arm and is configured to support the second display.

13. The display stand as claimed in claim 12, wherein the first arm body has a first perforated groove, the first hinge has a first portion, a first engaging end, a first fixing plate, a first fastener and a first shaft, the first engaging end is connected to the first portion and is slidably disposed in the first perforated groove, the first fastener and the first engaging end are located on the opposite two sides of the first arm body, and the first fastener is fastened to the first engaging end, such that the first hinge is optionally fixed on the first supporting arm, the first shaft is disposed on the first portion, the first fixing plate is pivotally disposed on the first shaft, the first display is disposed on the first fixing plate, and wherein the second arm body has a second perforated groove, the second hinge has a second portion, a second engaging end, a second fixing plate, a second fastener and a second shaft, the second engaging end is connected to the second portion and is slidably disposed in the second perforated groove, the second fastener and the second engaging end are located on the opposite two sides of the second arm body, and the second fastener is fastened to the second engaging end, such that the second hinge is optionally fixed on the second supporting arm, the second shaft is disposed on the second portion, the second fixing plate is pivotally disposed on the second shaft, the second display is disposed on the second fixing plate.

* * * * *

UNITED STATES PATENT AND TRADEMARK OFFICE
CERTIFICATE OF CORRECTION

PATENT NO.        : 10,760,727 B2
APPLICATION NO.   : 16/413625
DATED             : September 1, 2020
INVENTOR(S)       : Ming-Hsien Huang Page 1 of 1

It is certified that error appears in the above-identified patent and that said Letters Patent is hereby corrected as shown below:

On the Title Page

Item (60) Related U.S. Application Data, should read:
Provisional application No. 62/673,135, filed on May 18, 2018.

Signed and Sealed this
Twenty-fourth Day of November, 2020

Andrei Iancu
*Director of the United States Patent and Trademark Office*